United States Patent Office 3,364,004
Patented Jan. 16, 1968

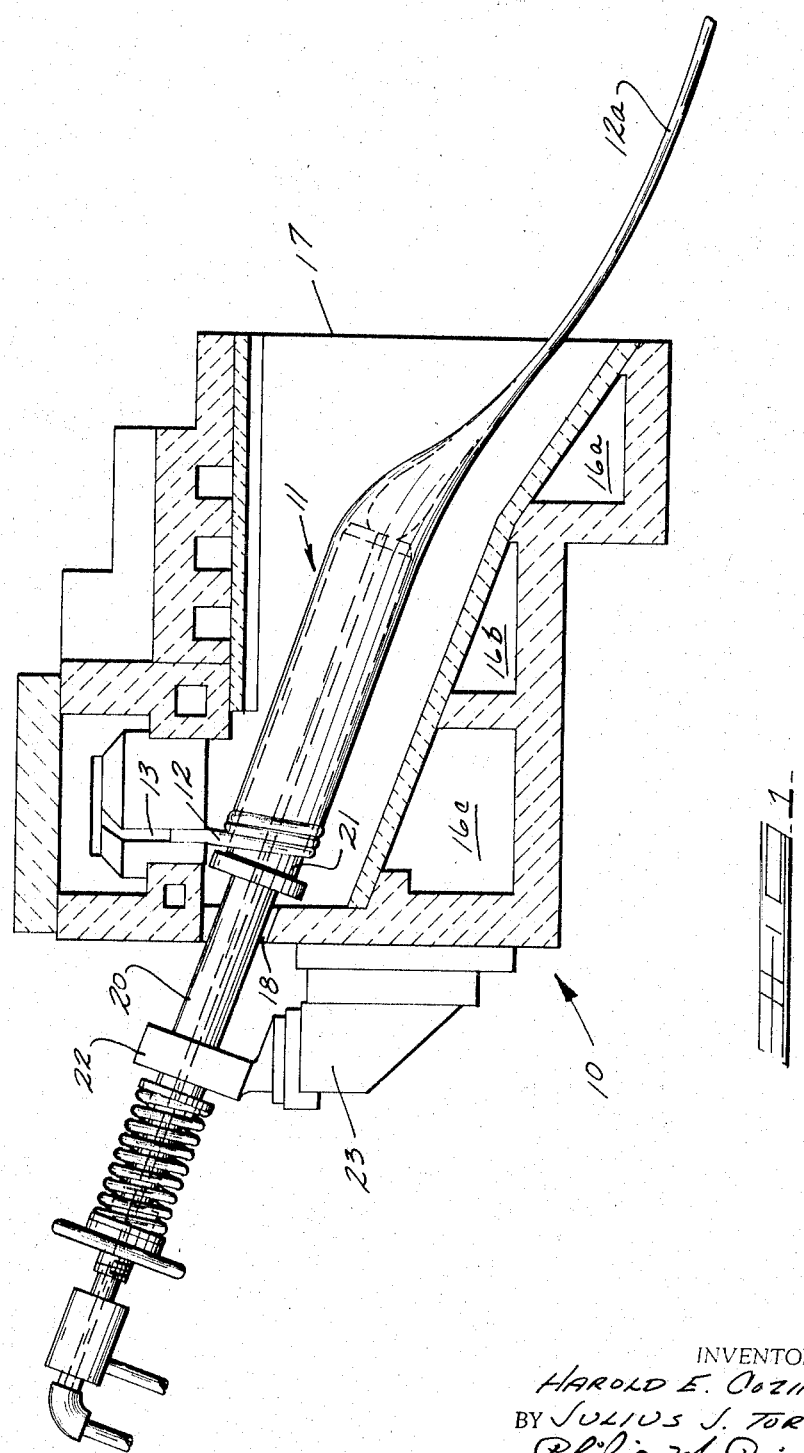

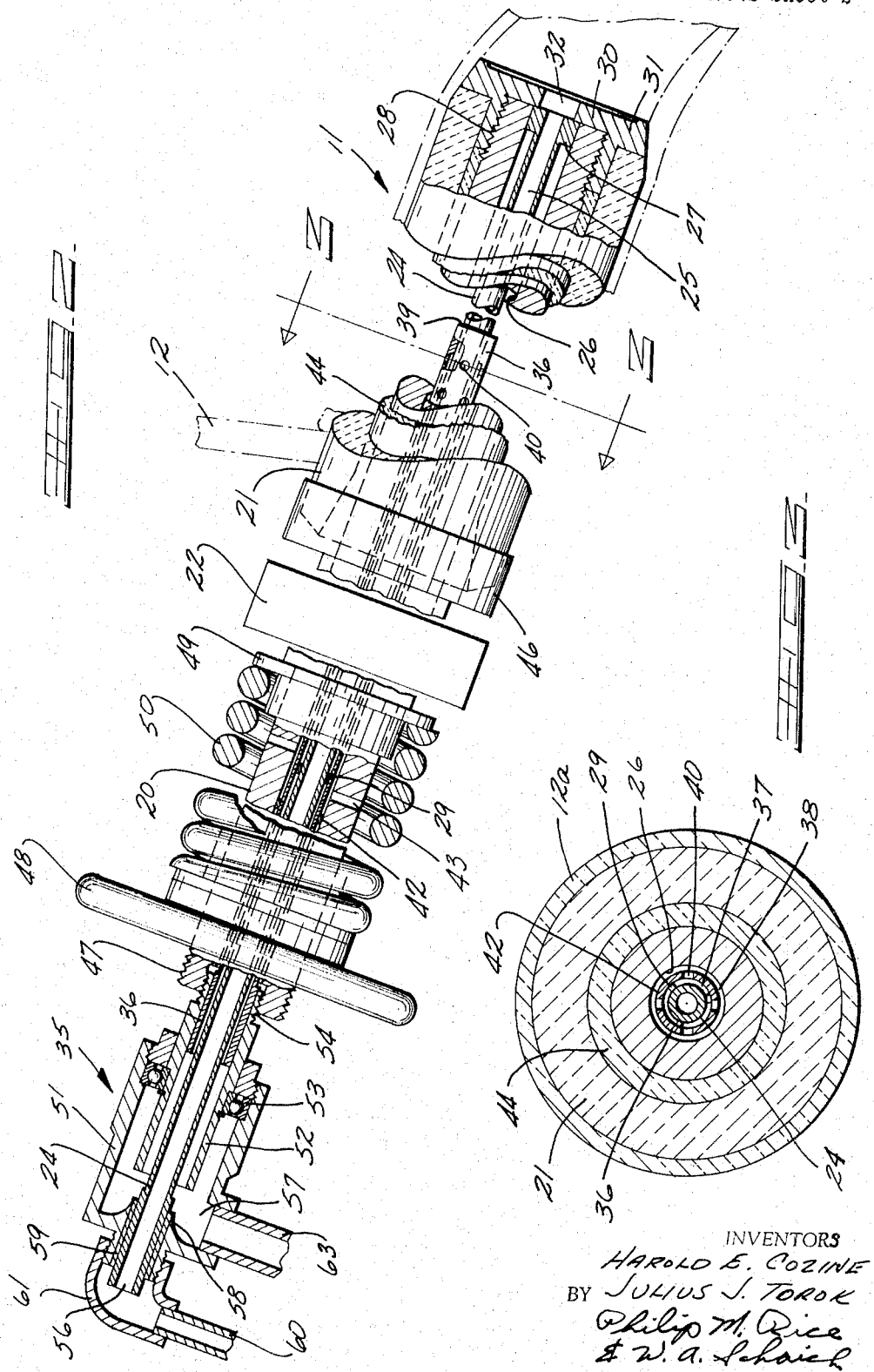

3,364,004
APPARATUS FOR DRAWING GLASS IN CYLINDRICAL FORM
Harold E. Cozine, Vineland, N.J., and Julius J. Torok, Toledo, Ohio, assignors to Owens-Illinois Inc., a corporation of Ohio
Filed Oct. 8, 1964, Ser. No. 402,463
4 Claims. (Cl. 65—187)

ABSTRACT OF THE DISCLOSURE

The apparatus disclosed herein comprises a hollow mandrel which includes a sleeve that is rotatably supported in position for receiving a wrap of molten glass. A hollow blowpipe is supported within the sleeve and extends to the downstream end of the sleeve over which the molten glass is drawn in tubular form. A cooling air pipe is positioned within the sleeve surrounding the blowpipe to define a first cooling fluid passageway between the air pipe and the blowpipe and a second cooling fluid passageway between the air pipe and the sleeve. Cooling fluid is supplied to the first passageway and flows through apertures in the cooling air pipe to the second passageway and is thereafter exhausted. The sleeve comprises an outer ceramic tubular member, an inner tubular member or blowpipe and insulation between the two members.

---

This invention relates to improvements in apparatus for continuously drawing rod, tubing, or the like of glass or other thermoplastic material and, more particularly, relates to an improved forming mandrel for drawing such articles.

The present invention is especially adapted for use in conjunction with apparatus such as that described in U.S. Patent No. 1,219,709 to Danner, issued Mar. 20, 1917, entitled, "Apparatus for Forming Molten Material in Cylindrical Form." In such apparatus a supply stream of molten glass flows downwardly onto a continuously rotating downwardly-inclined tapered mandrel and either solid rod or hollow tubing is continuously drawn from the lower or discharge end of the mandrel. The working portion of the mandrel as well as the flowing supply stream and deposited glass surrounding the working portion of the mandrel are all enclosed in a heated chamber or muffler to control glass temperatures to obtain a uniform product.

Conventionally in the manufacture of glass rod or tubing as practiced by the Danner process, a tubular refractory sleeve is mounted on a metallic blowpipe which serves to permit the molten glass to flow thereon due to the rotation of the mandrel as well as the action of gravity in combination with lengthwise drawing of the material therefrom in a substantially horizontal direction. In the making of tubing, the mandrel discharge end has a perforated tip which is employed as a blowpipe, and in the making of rod, an imperforate tip is utilized having a conical shape at its lower extremities.

As is well known in the field of metallurgy, the strength of metals diminishes rapidly as the temperature increases above the critical level for that particular metal. Metals at elevated temperatures may fail either by creep or by rupture. (See Basic Engineering Metallurgy, Carl A. Keyser, 1952, Prentice-Hall, Inc., Englewood Cliffs, N.J., pp. 36–43 or Design of Machine Elements, third edition, Virgil Moring Faires, 1955, The MacMillan Co., New York, pp. 522–523, for a more detailed discussion of high temperature failure of metals.) In the Danner process the molten glass flowing onto the refractory sleeve of the mandrel raises the temperature of the portion of the prevalence of metal blowpipe lying thereunder to a range where failure by creep or rupture is high. Such elevated temperatures coupled with the cantilevered mounting of the blowpipe which is inherent in the Danner process results in a high incidence of failure by creep, even after relatively short periods of time thereby requiring replacement of the mandrel long before otherwise required.

Previous attempts to solve this problem, as by cooling the blowpipe, have met with little or no success because of the fact that the blowpipe, if cold, would exert so much heat from the refractory sleeve and the glass on it that the process would become unbalanced or inoperative.

Accordingly, it is an object of the present invention to provide a mandrel capable of having molten glass wrapped therearound and yet capable of withstanding the forces and heat applied thereto for extended periods of time.

It is a further object of the present invention to provide a new and novel mandrel characterized by cooling means for the blowpipe which does not adversely affect the wrapping and drawing of molten glass from the refractory sleeve.

An additional object of the present invention is to provide a mandrel in which the exterior surface of the refractory sleeve is allowed to seek its optimum temperature, i.e. approximately the temperature of the glass flowing over it, without adversely affecting the strength of the metal blowpipe.

The specific nature of this invention, as well as other objects and advantages thereof, will become apparent to those skilled in the art from the following detailed description taken in conjunction with the annexed sheets of drawings on which:

FIGURE 1 is an elevational view, partly in section, showing the mandrel of the present invention positioned to receive molten glass.

FIGURE 2 is a detailed elevational view, partly in section, showing the mandrel of the present invention.

FIGURE 3 is a sectional view of the mandrel taken along line 3—3 of FIGURE 2.

Referring now to FIGURE 1, there is illustrated a muffler or chamber generally designated 10 which encloses the leading portion of a downwardly inclined mandrel generally designated 11 upon the external surface of which molten glass flows.

The molten glass is delivered onto the mandrel in the form of a supply stream 12 flowing from a delivery trough 13 positioned at the terminating end of a furnace forehearth (not shown). The molten glass stream 12 is continuously deposited on rotating mandrel 11 and smoothly flows over its essentially cylindrical surfaces initially in a helical, then in a cylindrical pattern and subsequently in a frusto-conical pattern. The glass is drawn in a constricting manner in catenary form from the discharge end of mandrel 11 as prescribed rates into a lengthy cylindrical product comprising rod or tubing 12a as set forth hereinbelow.

Forming chamber or muffle 10 is fabricated or lined with refractory material and is surrounded by a plurality of heating chambers 16a, 16b, and 16c, which contain gas flames and/or products of combustion of burner fires to maintain elevated temperatures within the chamber. The discharge end 17 of the muffle 10 from which the glass rod or tubing 12a is drawn may be generally open as shown or essentially fully enclosed except for a relatively small opening through which the glass product is drawn.

The mandrel 11 is mounted in a downwardly inclined cantilevered relation projecting through an opening 18 in the muffle chamber. The mandrel is rotatably mounted exteriorly of the chamber on a combination sleeve-drive and blowpipe chuck 22 resting on a support member 23. One such drive and support mechanism is illustrated in U.S. Patent No. 2,402,924; however, it should be obvious that any conventional rotary drive and support mechanism may be utilized.

The mandrel 11 includes an inflating air pipe 24 having an inflating air passageway 25. The inflating air pipe 24 is positioned within a central bore 26 of a blowpipe 20 and is maintained in spaced relationship thereto. The inflating air pipe 24 terminates at its outlet end in a radially outwardly directed flange 27 which is welded to the blowpipe 20 and serves to maintain the inflating air pipe 24 centrally positioned in the blowpipe 20. Additionally, a plurality of at least three circumferentially aligned, substantially equally spaced apart lugs 29 are rigidly secured to the external surface of the inflating air pipe 24. The outlet end of the blowpipe 20 is provided with externally disposed threads 28. Threadedly engaged to the blowpipe threads 28 is a cap member 30 having an outwardly extending flange 31 and a centrally disposed aperture 32 through which inflating air flows from the inflating air pipe 24 to the interior of the being-drawn tubing 12a.

As will be described in greater detail later, the inlet end of the blowpipe 20 is secured to a rotary union generally designated 35.

Positioned in the space between the inflating air pipe 24 and the blowpipe 20 is a cooling air pipe 36 which is maintained in spaced relationship with both the blowpipe 20 and the inflating air pipe 24. The external surface of the inflating air pipe 24 cooperates with the internal surface of the cooling air pipe 36 to define an annular cooling air inlet passageway 37. The external surface of the cooling air pipe 36 cooperates with the bore 26 of blowpipe 20 to define an annular cooling air outlet passageway 38. The lugs 29 of the inflating air pipe 24 are received within the cooling air pipe 36 and serve to maintain the inlet end of the inflating air pipe 24 centrally positioned therein.

As can be seen by viewing FIGURE 2 of the drawings, it is not necessary that the cooling air pipe 36 extend completely to the end of the mandrel 11. Rather, it is only necessary that it extend downstream a substantial distance from the point at which the supply stream 12 of molten glass is applied to the mandrel. Thus, the molten glass cools extremely rapidly after being wrapped onto the mandrel thereby decreasing the need for substantial cooling near the outlet end of the mandrel. Additionally, by virtue of the cantilevered mounting of the mandrel 11, the portion of the mandrel adjacent the free or downstream end are subjected to much smaller bending stresses than those portions lying further upstream towards the supported end. While it is obvious that the portion of the mandrel immediately adjacent to the combination sleeve-drive and blowpipe chuck 22 is subjected to greater bending stresses than any other portion of the mandrel, the portion of the mandrel 11, and more specifically of the blowpipe 20 thereof, most likely to fail in bending is that portion underlying the molten glass stream. Thus, this point on the mandrel is subjected to the highest temperatures, temperatures at which there is a low creep strength for the metal from which the blowpipe 20 is formed, and yet is subjected to a higher bending stress than any point on the mandrel lying downstream therefrom. (The blowpipe is generally formed of Nichrome metal; however, high temperature steel alloys or other metals may be used. The metal used will desirably have the ability of maintaining creep strength at high temperatures and of being oxidizing resistant.) Thus can be seen the necessity of concentrating the cooling efforts in the area of the mandrel lying in the vicinity of an immediately downstream from the point at which the molten glass stream 12 is applied thereto. In the actual operation, rotation of the mandrel serves to neutralize, to a degree, the above mentioned bending stresses. However, despite this neutralization there is a distinct tendency for unbalanced forces to be applied to the mandrel thereby resulting in failure of the blowpipe 20. The unbalanced forces may result from a variety of factors, such as the eccentric rotation of the mandrel 11.

In the preferred embodiment, the cooling air pipe 36 terminates downstream in an end 39 which is secured to the inflating air pipe in a manner which closes the cooling air inlet passageway 37 as by welding. Under this embodiment, communication between the cooling air inlet passageway 37 and cooling air outlet passageway 38 is provided by a plurality of apertures 40 in the cooling air pipe 36. By closing off the inlet passageway 37 at the end 39 of the cooling air pipe, highly efficient cooling is accomplished in that smooth air flow of the cooling air is provided by the air flowing through the inlet passageway 37 and thence through the apertures 40 to the outlet passageway 38. In the alternative embodiment, it is possible to eliminate the apertures 40 in the sidewall of the cooling air pipe 36 by connecting the end 39 of the cooling air pipe 36 to the inflating air pipe 24 in a manner which permits the cooling air to flow past the end 39. This may be accomplished, for example, by connecting a series of spaced-apart connecting lugs between cooling air pipe 36 and the inflating air pipe 24. However, this arrangement has a somewhat reduced cooling efficiency in that the cooling air flowing from the end 39 of the cooling air pipe becomes entrapped in the bore 26 of the central blowpipe 20 adjacent the free end with the result that considerable turbulence is imparted to the flow of such cooling air.

The cooling air pipe 36 extends upstream past the inlet end of the central blowpipe 20 and into the rotary union 35. As pointed out, the outlet end of the cooling air pipe 36 is secured to the central blowpipe 20. In order to fix and hold the position of the inlet end of the cooling air pipe there is provided an annular ring 42 rigidly secured to the external surface of the cooling air pipe 36 and which is sized to be slidingly received within the bore 26 of the central blowpipe 20. Additionally, the central blowpipe 20 is provided with a plurality of outlet ports 43 communicating with the cooling air outlet passageway 38 thereby providing exhaust outlets for the cooling air. As shown in FIGURE 3, the ports 43 are located upstream from the upstream end of the refractory member 21.

As previously pointed out, the mandrel is supported by the combination sleeve-drive and blowpipe chuck 22. Briefly, and as may be seen from the previously referenced U.S. Patent No. 2,402,924, the central blowpipe 20 functions as the supporting member for the remainder of the mandrel and is itself supported as a cantilever in an area upstream from the upstream end of the refractory member 21. The sleeve-drive and blowpipe chuck 22 has a sleeve gear which is secured to the central blowpipe 20. Such gear is engaged by a worm which imparts a rotary movement to the blowpipe 20 and, thus, to the mandrel 11. Any desired power means may be utilized to impart such rotary movement to the blowpipe 20.

The refractory member 21 is subjected to greater wear than any of the other components of the mandrel 11. Accordingly, it is desirable that provisions be made for easily removing the refractory memebr 21 from the central blowpipe 20. Accordingly, the refractory member 21 is adapted to be telescoped over the outlet end of the blowpipe 20 when the cap member 30 is removed therefrom. An annular layer of insulating material 44 having a relatively low coefficient of thermal conductivity is positioned between the refractory member 21 and the central blowpipe 20 to retard the transmission of heat from the refractory member to the blowpipe. The free end of the refractory member 21 is engaged by the flange 31 of the cap member 30 upon application of the cap member to the externally disposed threads 28 of the blowpipe 20. The upstream end of the refractory member 21 is engaged by a metallic back collar 46 which is adapted to equalize compressive forces imparted to the refractory member 21.

The upstream end of the blowpipe 20 is provided with externally disposed threads 47 to which is engaged a threaded hand wheel 48. Additionally, there is provided a flanged collar 49 which is telescoped over the blowpipe 20 and maintained in a slidable relationship thereto. A compression spring 50 is positioned between the hand wheel 48 and the collar 49.

The compression spring 50 acts to urge the hand wheel 48 and in turn the blowpipe 20 backwards, slipping through the blowpipe chuck 22. The cap member 30 being attached to the blowpipe moves backward moving the refractory sleeve 21 back against the back collar 46 which in turn is urged through a spacer (not shown) against the blowpipe chuck and sleeve-drive 22 to thereby snugly hold the refractory member between the back collar 46 and the cap member 30. Preferably, spacers (not shown) are positioned between the sleeve-drive and blowpipe chuck 22 and the back collar 46. Rotation of the hand wheel 48 serves to vary the compressive force to which the refractory member 21 is subjected.

The rotary union 35 is provided with a housing 51 having a tubular member 52 mounted in bearings 53 for rotation therewith. The tubular member 52 projects outwardly from the housing 51 and terminates in a threaded end portion 54 of reduced cross-sectional size which engages inwardly facing threads at the end of the central blowpipe 20. The rotary union 35 is provided with an inflating air inlet port 56 and a cooling air inlet port 57. The inflating air inlet port 56 is axially aligned with the inflating air pipe 24 and is located at a build-up end portion 58 of the housing 51. The inflating air pipe 24 is rotatably received in the build-up end portion 58. Bushings 59 are positioned between such build-up end portion 58 and the inflating air pipe 24. Air supply means communicate with the inflating air inlet port 56 through conduit 60 and elbow 61. Thus, inflating air flows through the conduit 60 and elbow 61 into the inflating air pipe 24 and passes through the cap member aperture 32 to the interior of the tubing 12a.

Cooling air is delivered from any desired source (not shown) through a conduit 63 communicating with the cooling air inlet 57 to the interior of the housing 51. From there, the cooling air flows into the annular passageway between the tubular member 52 and the inflating air pipe 24. The cooling air pipe 36 extends into and is sealingly secured to the tubular member 52. Thus, cooling air flowing into the annular passageway between tubular member 52 and inflating air pipe 24 passes into the annular cooling air inlet passageway 37 and through such passageway to the apertures 40 to the annular cooling air outlet passageway 38 and thence to the exhaust ports 43.

Where it is desired to form solid rod rather than hollow tubing, it is obviously not necessary to provide the inflating air means including the inflating air pipe 24. As a practical matter, however, all that need to be done is to replace the cap member 30 having the aperture 32 with a solid cap member such as that shown in FIGURE 12 of the aforementioned U.S. Patent No. 1,219,709 to Danner.

It can be readily seen from the foregoing description that the present invention provides a mandrel especially well adapted to shield the blowpipe 20 from the intense and damaging heat and yet permit the refractory member 21 to seek its optimum operating temperature, a temperature which approaches that of the molten glass supply stream 12.

Various modifications may be resorted to within the spirit and scope of the appended claims.

We claim:
1. For use in forming cylindrical glass articles,
   a hollow mandrel (11) comprising a closed cavity sleeve,
   means for rotatably supporting said closed cavity sleeve in position for receiving a wrap of molten glass,
   means on the downstream end of said closed cavity sleeve over which the molten glass is drawn in tubular form,
   inflating air supply means (24) centrally mounted within said closed cavity sleeve,
   cooling air distributing means (36) mounted between said closed cavity sleeve and said air supply means to define a sleeve cooling fluid passageway (38) between said closed cavity sleeve and said distributing means and an air supply means cooling fluid passageway (37) between said air distributing means and said air supply means,
   said air distributing means having means (40) thereon providing communication between said passageways,
   means defining a cooling fluid inlet and a cooling fluid outlet to said passageways.

2. The combination set forth in claim 1 wherein said sleeve comprises an outer ceramic tubular member, an inner tubular member and insulation between said two members.

3. The combination set forth in claim 1 wherein said means providing communication between said passageways comprises apertures in said cooling air distributing means.

4. The combination set forth in claim 1 wherein said cooling air distributing means terminates in spaced relationship to the downstream closed end of said sleeve.

References Cited

UNITED STATES PATENTS 1,550,995   8/1925   Wilcox _____ 65—187

FOREIGN PATENTS 454,877   1/1928   Germany.
1,172,812   3/1957   France.

S. LEON BASHORE, *Acting Primary Examiner.*

F. W. MIGA, *Assistant Examiner.*